(12) United States Patent
Maier

(10) Patent No.: US 8,408,651 B2
(45) Date of Patent: Apr. 2, 2013

(54) MOTOR VEHICLE SEAT WITH AN ADJUSTING DEVICE

(75) Inventor: Jürgen Maier, Weitersweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 457 days.

(21) Appl. No.: 12/628,857

(22) Filed: Dec. 1, 2009

(65) Prior Publication Data

US 2010/0164267 A1  Jul. 1, 2010

(30) Foreign Application Priority Data

Dec. 2, 2008  (DE) .................. 10 2008 059 999

(51) Int. Cl.
*A47C 1/00* (2006.01)

(52) U.S. Cl. ............ 297/344.24; 297/344.21; 296/65.11

(58) Field of Classification Search ............. 297/344.21, 297/344.24, 344.1; 296/65.16, 65.11, 65.13, 296/65.14, 65.06

See application file for complete search history.

(56) References Cited

U.S. PATENT DOCUMENTS

| | | | | |
|---|---|---|---|---|
| 3,013,837 | A | * | 12/1961 | Pessl et al. .................. 296/68.1 |
| 5,474,353 | A | * | 12/1995 | Koester et al. ............. 296/65.07 |
| 6,557,919 | B2 | * | 5/2003 | Suga et al. ................. 296/65.07 |
| 6,572,172 | B1 | * | 6/2003 | Ninomiya et al. ......... 296/65.12 |
| 6,883,868 | B2 | * | 4/2005 | Yoshida ........................ 297/331 |
| 6,981,746 | B2 | * | 1/2006 | Chung et al. ............. 297/344.21 |
| 7,422,264 | B1 | * | 9/2008 | Lung et al. ................. 296/65.01 |
| 7,434,863 | B2 | * | 10/2008 | Hamazaki et al. ......... 296/65.07 |
| 7,648,186 | B2 | * | 1/2010 | Ukai et al. ................. 296/65.06 |
| 7,850,220 | B2 | * | 12/2010 | Holdampf ................. 296/65.13 |
| 2006/0226685 | A1 | * | 10/2006 | Priepke et al. ............ 297/344.24 |
| 2007/0246987 | A1 | * | 10/2007 | Sano et al. ................ 297/344.24 |
| 2009/0127908 | A1 | * | 5/2009 | Kucharski et al. ....... 297/344.24 |

FOREIGN PATENT DOCUMENTS

| | | |
|---|---|---|
| DE | 20004346 U1 | 11/2000 |
| DE | 20102091 U1 | 6/2002 |
| DE | 102004017138 A1 | 10/2005 |
| DE | 102006022732 A1 | 11/2007 |
| EP | 0343026 A2 | 11/1989 |

(Continued)

OTHER PUBLICATIONS

British Patent Office, British Search Report for British Application No. 0920657.4, Mar. 16, 2010.

(Continued)

*Primary Examiner* — David Dunn
*Assistant Examiner* — David E Allred
(74) *Attorney, Agent, or Firm* — Ingrassia Fisher & Lorenz, P.C.

(57) ABSTRACT

A motor vehicle seat is provided with an adjusting device that includes, but is not limited to a longitudinal sliding device for sliding the motor vehicle seat in a longitudinal direction and a transverse sliding device for sliding the motor vehicle seat in transverse direction. The transverse sliding device includes, but is not limited to at least one swiveling lever which on the one hand is arranged on the longitudinal sliding device and on the other hand indirectly or directly on the motor vehicle seat. The swiveling lever can be swiveled from a first swiveling position, in which the motor vehicle seat is arranged in a transverse position, into a second swiveling position in which the motor vehicle seat relative to the first transverse position is arranged in transverse direction offset in a second transverse position.

20 Claims, 2 Drawing Sheets

FOREIGN PATENT DOCUMENTS

| | | |
|---|---|---|
| EP | 1488951 A1 | 12/2004 |
| FR | 2878790 A1 | 6/2006 |
| GB | 2404141 A | 1/2005 |
| JP | 61163034 A * | 7/1986 |
| JP | 63162347 A * | 7/1988 |
| WO | 2009054788 A1 | 4/2009 |
| WO | 2009083773 A1 | 7/2009 |

OTHER PUBLICATIONS

UK, IPO British Examination Report for Application No. 0920657.4, dated Apr. 17, 2012.

German Patent Office, German Search Report for Application No. 102008059999.9, Apr. 3, 2009.

* cited by examiner

MOTOR VEHICLE SEAT WITH AN ADJUSTING DEVICE

CROSS-REFERENCE TO RELATED APPLICATION

This application claims priority to German Patent Application No. 102008059999.9, filed Dec. 2, 2008, which is incorporated herein by reference in its entirety.

TECHNICAL FIELD

The present invention relates to a motor vehicle seat with an adjusting device having a longitudinal sliding device for sliding the motor vehicle seat in longitudinal direction and a transverse sliding device for sliding the motor vehicle seat in transverse direction.

BACKGROUND

DE 10 2006 022 732 A1 describes a motor vehicle seat with an adjusting device having a longitudinal sliding device and a transverse sliding device. The floor-sided longitudinal sliding device comprises two parallel rail arrangements running in longitudinal direction. Thus the rail arrangements each comprise a vehicle-fixed lower rail and an upper rail guided in the vehicle-fixed lower rail. The transverse sliding device is likewise formed of two rail arrangements, wherein the rail arrangements of the transverse sliding device each comprise a transverse rail which together with the upper rail of the longitudinal sliding device can be slid in longitudinal direction. The motor vehicle seat in turn is slidable in transverse direction along the transverse rails of the transverse sliding device.

The adjusting device of the known motor vehicle seat has the disadvantage that its space requirement is particularly large. Thus, more preferably the footwell of a vehicle occupant behind the known motor vehicle seat is restricted through the rear transverse rail of the transverse sliding device. The front transverse rail of the transverse sliding device of the known motor vehicle seat also prevents simple access from the front to the stowage space underneath the motor vehicle seat.

It is therefore at least one object of the present invention to create a motor vehicle seat with an adjusting device which on the one hand has a simple and space-saving structure and on the other hand allows simple sliding of the motor vehicle seat in longitudinal and/or transverse direction. In addition, other objects, desirable features, and characteristics will become apparent from the subsequent summary and detailed description, and the appended claims, taken in conjunction with the accompanying drawings and this background.

SUMMARY

The embodiments of the present invention comprise a motor vehicle seat, which for example can comprise a seat part and a backrest part, and an adjusting device assigned to the motor vehicle seat. Here, the adjusting device is preferentially integrated in or forms the seat underframe of the motor vehicle seat. The adjusting device comprises a longitudinal sliding device as well as a transverse sliding device. The longitudinal sliding device is designed in such a manner that the motor vehicle seat can be slid in longitudinal direction, whereas the transverse sliding device is designed in such a manner that the motor vehicle seat can be slid in transverse direction. Thus one of the longitudinal directions can for example correspond to the seat direction in which the vehicle occupant seated on the motor vehicle seat is looking The longitudinal sliding device can for example be formed of rail arrangements, wherein in this case preferentially two rail arrangements running in longitudinal direction, laterally spaced from each other and arranged in parallel are provided. According to an embodiment of the invention, the transverse sliding device comprises at least one swiveling lever. Thus, for example or preferentially, each of the two rail arrangements of the longitudinal sliding device can be assigned to swiveling levers each. On the one hand, the at least one swiveling lever is arranged on the longitudinal sliding device so that said swiveling lever is likewise slid in longitudinal direction upon sliding of the motor vehicle seat in longitudinal direction, and on the other hand directly or indirectly arranged on the motor vehicle seat. Thus, with an indirect arrangement of the swiveling lever on the motor vehicle seat a further adjusting device for example can be arranged between the swiveling lever and the motor vehicle seat, while with a direct arrangement of the swiveling lever for example can be arranged directly on the seat part of the motor vehicle seat. The swiveling lever in each case is designed in such a manner that from a first swiveling position, in which the motor vehicle seat is arranged in a first transverse position, it can be swiveled into a second swiveling position, in which the motor vehicle seat relative to the first transverse position in transverse direction is arranged offset in a second transverse position.

In contrast with the known adjusting devices, wherein the transverse sliding device is substantially formed by a transverse rail which is continuous in transverse direction, the transverse sliding device with the motor vehicle seat according to an embodiment of the invention is thus formed by a swiveling lever. A swiveling lever has the advantage that it can be designed substantially shorter than the known transverse rails and thus takes up less space. In addition the swiveling lever need not permanently and continuously extend in transverse direction underneath the motor vehicle seat, so that the footwell for the vehicle occupant seated at the back is not permanently restricted. The swiveling lever rather extends in the footwell or stowage space below the motor vehicle seat merely in certain of its swiveling positions.

In a preferred embodiment of the motor vehicle seat according to the invention, the swiveling lever is arranged on the longitudinal sliding device capable of being swiveled about a first swiveling axis extending in height direction. In that the first swiveling axis extends in height direction, swiveling of the swiveling lever about this first swiveling axis produces particularly marked sliding of the motor vehicle seat in transverse direction. In this manner, the desired transverse position of the motor vehicle seat is reached particularly rapidly.

In order to prevent that the rotary movement of the swiveling lever is also transmitted to the motor vehicle seat indirectly or directly arranged on the swiveling lever, the swiveling lever in a further preferred embodiment of the motor vehicle seat according to the invention is furthermore arranged on the motor vehicle seat in a manner capable of being swiveled about a second swiveling axis extending in height direction. Thanks to the swivelability of the swiveling lever relative to the motor vehicle seat the motor vehicle seat itself is not twisted but merely translatorically displaced in transverse direction. The orientation of the motor vehicle seat is thus retained.

In order to prevent that the footwell or stowage space underneath the motor vehicle seat is excessively restricted in transverse direction, the swiveling lever in a particularly preferred embodiment of the motor vehicle seat according to the invention extends at least in the first or second swiveling position in longitudinal direction and in another swiveling position in transverse direction. In that the swiveling lever extends in at least one of the mentioned swiveling positions in longitudinal direction, the restriction of the footwell or stowage space underneath the motor vehicle seat is minimized in at least this swiveling position of the swiveling lever.

In some motor vehicles the width of the vehicle interior space varies in longitudinal direction, which for example is due to the wheelhouses protruding to the inside. If a motor vehicle seat is now to be slid into a longitudinal section of the vehicle interior space thus narrowed without colliding with the wheelhouses or similar in the process, the motor vehicle seat has to be slid in longitudinal direction as well as in transverse direction. This renders the handling of the motor vehicle seat more difficult. In order to simplify the handling of the motor vehicle seat according to the invention in this regard the swiveling lever can be swiveled from the first swiveling position into the second swiveling position by sliding the motor vehicle seat into the one longitudinal direction so that the motor vehicle seat automatically also proceeds from the first transverse position into the second transverse position and a collision with the wheelhouse or similar is avoided. Thus the longitudinal and transverse sliding movements of the motor vehicle seat are coupled with each other in at least one sliding region so that the handling is substantially simplified. Alternatively or additionally the swiveling lever with this embodiment can be swiveled from the second swiveling position into the first swiveling position by sliding the motor vehicle seat in the longitudinal direction which is opposite to the aforementioned longitudinal direction. Thus with a motor vehicle seat with at least two swiveling levers the one swiveling lever can bring about the adjusting movement from the first transverse position into the second transverse position while the other adjusting lever brings about the resetting movement from the second transverse position into the first transverse position. An individual swiveling lever could also be designed in such a manner that it makes possible both the adjusting movement as well as the resetting movement in transverse direction.

In order to achieve particularly simple coupling of the longitudinal and transverse sliding movement of the motor vehicle seat a support strut is additionally provided on the swiveling lever in a particularly advantageous embodiment of the motor vehicle seat according to the invention, which upon longitudinal sliding of the motor vehicle seat subject to the creation of the swiveling movement of the swiveling lever is supportable on a fixed stop of the adjusting device. Thus the fixed stop can be arranged for example on a fixed and thus non-slidable part of the longitudinal sliding device or fixed on another part of the motor vehicle. A bolt is also possible for example as fixed stop. In any case, the fixed stop takes up very little space wherein preferentially a separate fixed stop is made available to each swiveling lever in order to make possible brisk initiation of the swiveling movement of all swiveling levers and to relieve other components of the adjusting device.

In a further advantageous embodiment of the motor vehicle seat according to the invention, the swiveling lever and the support strut are arranged at an angle to each other so that the support strut can securely extend as far as to the corresponding fixed stop. With an arrangement of the support strut at an angle relative to the swiveling lever which includes any arrangement of the support strut at an angle smaller than 180° relative to the swiveling lever, at least the swiveling lever should extend in longitudinal direction in the first or second swiveling position as was already explained with reference to an embodiment described above.

In order to create a particularly sturdy transverse sliding device of the adjusting device the swiveling lever and the support strut in a further advantageous embodiment of the motor vehicle seat according to the invention are embodied in one piece. Thus the swiveling lever and the support strut can for example form a one-piece angle iron.

In order to create a preferably wide footwell or stowage space underneath the motor vehicle seat the longitudinal sliding device in a further preferred embodiment of the motor vehicle seat according to the invention comprises at least one rail arrangement extending in longitudinal direction. Preferentially two rail arrangements extending in longitudinal direction, which are arranged spaced from each other and parallel to each other in transverse direction, can be provided in order to create a particularly wide footwell or stowage space. The rail arrangement furthermore preferentially comprises a vehicle-fixed lower rail and an upper rail guided on the vehicle-fixed lower rail. As already explained before, it is furthermore preferred if the swiveling lever in the first or second swiveling position extends parallel to the rail arrangement. In addition to this it is particularly preferred if the swiveling lever running parallel to the rail arrangement in the first or second swiveling position runs above the respective rail arrangement so that the width of the footwell or stowage space underneath the motor vehicle seat is not unnecessarily restricted in the swiveling lever is located in the first or second swiveling position.

In order to make possible a particularly secure supporting of the motor vehicle seat via the transverse sliding device at least two, preferentially four swiveling levers are provided in a further advantageous embodiment of the motor vehicle seat according to the invention. Here it is particularly preferred if at least one, preferentially two swiveling levers are arranged on the one side and at least one, preferentially two swiveling levers on the opposite side of the adjusting device. Thus at least one swiveling lever for example can be arranged on the upper rail of the first rail arrangement of the longitudinal sliding device while another swiveling lever can be arranged for example on the upper rail of the opposite rail arrangement of the longitudinal sliding device.

According to a further preferred embodiment of the motor vehicle seat according to the invention at least two swiveling levers are again provided, wherein a swiveling lever interacts with the corresponding stop in such a manner that the swiveling levers through sliding of the motor vehicle seat can be swiveled into the one longitudinal direction from the first swiveling position into the second swiveling position, while another swiveling lever interacts with the corresponding stop in such a manner that the swiveling levers through sliding of the motor vehicle seat in the opposite longitudinal direction are swiveled from the second swiveling position into the first swiveling position. Thus with this embodiment one of the swiveling levers brings about the adjusting movement from the first transverse position of the motor vehicle seat into the second transverse position, while another swiveling lever brings about the resetting movement from the second transverse position of the motor vehicle seat into the first transverse position. Although the adjusting and resetting movement could also be brought about through merely one of the swiveling levers, the function division over at least two swiveling levers has proved to be advantageous among other things in a constructive respect.

In an alternative embodiment of the embodiment described above the swiveling lever is preloaded into the first or second swiveling position, which can for example be brought about via a suitable spring element. Here, the preload supports the adjustment of the swiveling lever into the first or second swiveling position and thus the movement of the motor vehicle seat into the first or second transverse position. The handling of the motor vehicle seat at least during sliding into one of the two transverse positions is facilitated through this while the sliding into the other transverse position has to take place against the preload force of the spring element employed.

The above embodiments, wherein the swiveling position of the swiveling lever is brought about directly under the influence of the fixed stop of the adjusting device has proved to be particularly advantageous and space-saving. In an alternative embodiment to this, the adjusting device of the motor vehicle seat according to the invention comprises a positive guide for coupling the longitudinal and transverse sliding movement of the motor vehicle seat. Such a positive guide preferentially is a slotted guide. This embodiment has the advantage that the positive or slotted guide need not be arranged in the immediate vicinity of the swiveling levers. Any arrangement on the motor vehicle seat is possible. Thus, it is particularly preferred if the positive guide on the one hand comprises a guide slot which is formed fixed on the vehicle or fixed on the seat and on the other hand a guide part guided in the guide slot which is embodied fixed on the seat or fixed on the vehicle, wherein the guide slot comprises at least one inclined section which extends transversely to the longitudinal direction and transversely to the transverse direction so that specific coupling of the longitudinal and transverse sliding movement of the motor vehicle seat is possible.

According to a further preferred embodiment of the motor vehicle seat according to the invention neither a fixed stop for the support strut of the swiveling lever or a positive guide in form of a slotted guide is provided, rather a gear drive via which coupling of the longitudinal sliding of the motor vehicle seat with the swiveling movement of the swiveling lever is brought about.

In order to make possible locking of the motor vehicle seat in various transverse and longitudinal positions of said motor vehicle seat the swiveling lever can be locked in various swiveling positions. To this end, a rotary latch lock is preferentially provided in the region of the first swiveling axis of the respective swiveling lever. By locking the swiveling lever, locking of the motor vehicle seat in longitudinal direction can also be brought about with appropriate coupling with the longitudinal sliding device.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
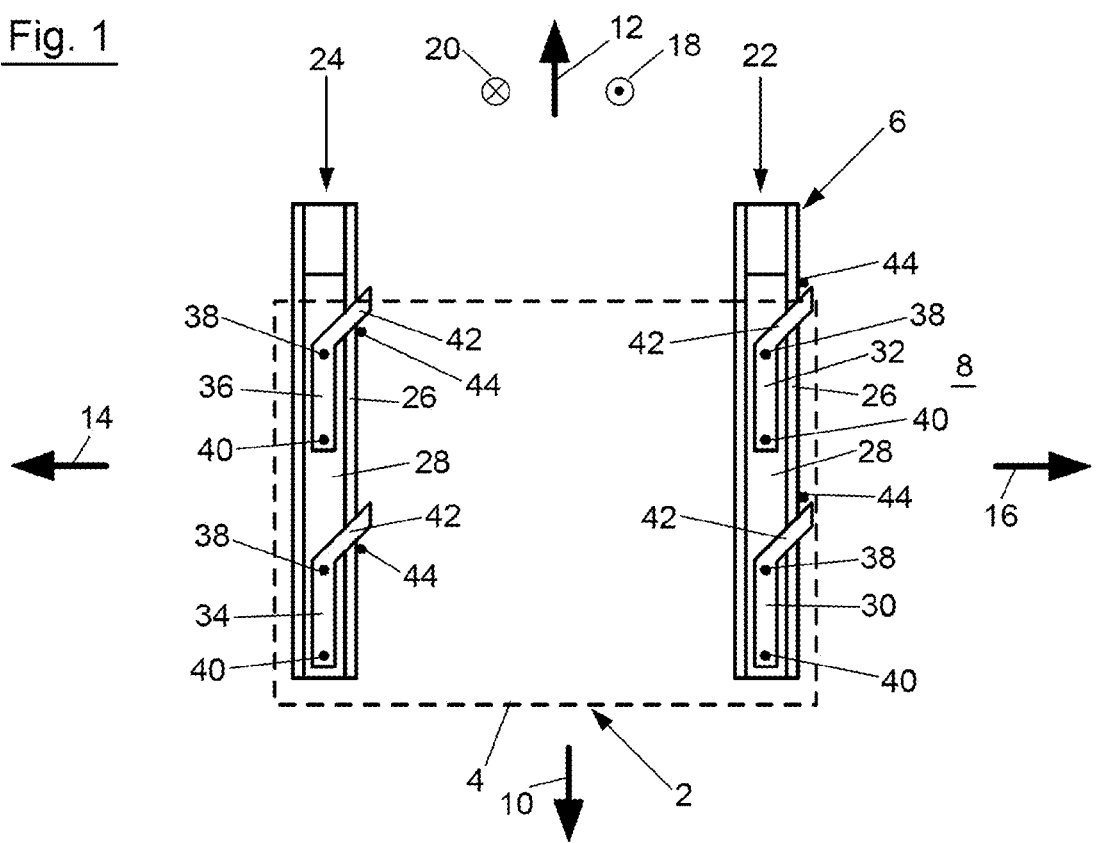
FIG. 1 a schematic representation of the motor vehicle seat according to an embodiment of the invention with the adjusting device in a top view, wherein the motor vehicle seat is arranged in a first longitudinal position and a first transverse position.

FIG. 1 shows a motor vehicle seat 2 of which merely the seat part 4 is hinted dashed, and an adjusting device 6 assigned to the motor vehicle seat 2. The motor vehicle seat 2 or its seat part 4 is arranged on a vehicle floor 8 via the adjusting device 6. The longitudinal directions 10, 12 opposing each other, the transverse directions 14, 16 opposing each other and the height directions 18, 20 of the motor vehicle seat 2 opposing each other are indicated in the figures by means of suitable arrows, wherein the longitudinal direction 10 can also be described as sitting direction. The adjusting device 6 in height direction 18, 20 is thus arranged between the seat part 4 of the motor vehicle seat 2 on the one hand and the vehicle floor 8 on the other hand.

The adjusting device 6 initially comprises a longitudinal sliding device for sliding the motor vehicle seat 2 in longitudinal direction 10, 12. In the present example the longitudinal sliding device comprises a first rail arrangement 22 and a second rail arrangement 24. The two rail arrangements 22, 24 each extend in longitudinal direction 10, 12, are spaced from each other in transverse direction 14, 16 and run parallel to each other. Each rail arrangement 22, 24 comprises a vehicle-fixed lower rail 26 which is fastened on the vehicle floor 8 and an upper rail 28 guided in longitudinal direction 10, 12 on or in the vehicle-fixed lower rail 26.

The adjusting device 6 furthermore comprises a transverse sliding device for sliding the motor vehicle seat 2 in transverse direction 14, 16. In the present embodiment the transverse sliding device substantially consists of 4 swiveling levers 30, 32, 34, 36. The swiveling levers 30, 32, 34, 36 are each arranged or fastened on one of the upper rails 28, 28 capable of being swiveled about a first swiveling axis 38 extending in height direction 18, 20. Thus the swiveling levers 30, 32 in longitudinal direction 10, 12 are arranged one after the other on the upper rail 28 of the first rail arrangement 22, while the swiveling levers 34, 36 in longitudinal direction 10, 12 are arranged one after the other on the upper rail 28 of the second rail arrangement 24.

At the end of the swiveling levers 30, 32, 34, 36 facing away from the first swiveling axis 38 the swiveling levers 30, 32, 34, 36 are fastened or arranged indirectly or directly on the seat part 4 of the motor vehicle seat 2. Here the swiveling levers 30, 32, 34, 36 are each arranged on or fastened to the motor vehicle seat 2 in a manner capable of being swiveled about a second swivel axis 40 extending in height direction 18, 20.

In the region of the first swivel axis 38 a support strut 42 is additionally provided on the swiveling lever 30, 32, 34, 36. Here the support strut 42 is arranged at an angle to the respective swiveling lever 30, 32, 34, 36, i.e. the swiveling lever 30, 32, 34, 36 and the support strut 42 each enclose an angle which is smaller than 180°. Here, the support strut 42 and the corresponding swiveling lever 30, 32, 34, 36 each form an angular piece formed in one piece.

Each of the aforementioned support struts 42 is assigned a bolt-shaped, fixed stop 44 of the adjusting device 6 each, which is embodied separately from the swiveling lever 30, 32, 34, 36 or the support strut 42. The fixed stops 44 are laterally fastened to the vehicle-fixed lower rails 26 and protrude in height direction 18 over the top of the rail arrangements 22, 24 as is more preferably evident in FIG. 3. Alternatively the fixed stops 44 can also be embodied as part of the respective vehicle-fixed lower rail 26 or form one part with said lower rail.

In the following, the operation and additional features of the motor vehicle seat 2 and the adjusting device 6 are described making reference to FIG. 1 and FIG. 2.

In FIG. 1, the motor vehicle seat 2 is in a first longitudinal position in which the motor vehicle seat 2 in longitudinal direction 10 or in sitting direction is arranged offset forward. Furthermore, the motor vehicle seat is in a first transverse position in which the motor vehicle seat 2 relative to the adjusting device 6 or the transverse directions 14, 16 is substantially arranged in the middle. The swiveling levers 30, 32, 34, 36 in this case are located in a first swiveling position in which the swiveling levers 30, 32, 34, 36 extend in longitudinal direction 10, 12.

In this first swiveling position of the swiveling levers 30, 32, 34, 36, the swiveling levers 30, 32, 34, 36 thus extend above the respective rail arrangement 22, 24 and parallel to the latter so that the footwell or stowage space underneath the motor vehicle seat 2 in transverse direction 14, 16 is not unnecessarily restricted through the swiveling levers 30, 32, 34, 36. Compared with this, the support struts 42 arranged at an angle on the swiveling levers 30, 32, 34, 36 protrude in transverse direction 14 or 16 so far that said support struts in longitudinal direction 12 are positioned before or behind the corresponding fixed stop 44. Thus the support struts 42 of the swiveling levers 30, 32 are arranged in longitudinal direction 12 in front of the corresponding fixed stop 44 while the support struts 42 of the swiveling levers 34, 36 in longitudinal direction 12 are arranged behind the corresponding fixed stop 44 when the swiveling levers 30, 32, 34, 36 are located in the first swiveling position.

Figure 2:
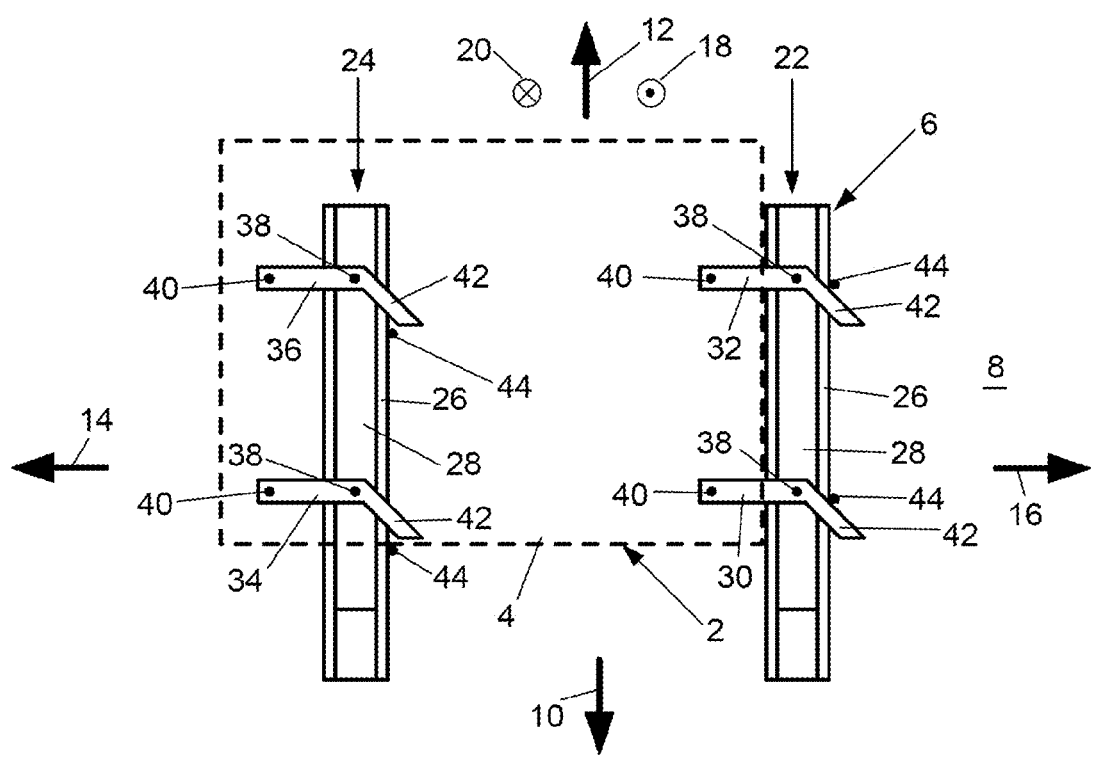
FIG. 2 is the motor vehicle seat of FIG. 1, wherein the motor vehicle seat is arranged in a second longitudinal position and a second transverse position.

If the motor vehicle seat 2 is now slid from the first longitudinal position shown in FIG. 2 in longitudinal direction 12 to the back into a second longitudinal position, which is shown in FIG. 2, the upper rails 28 within the vehicle-fixed lower rails 26 slide in longitudinal direction 12 to the back. In the process, the swiveling levers 30, 32, 34, 36 fastened to the upper rails 28 in the region of the first swiveling axis 38 are also displaced in longitudinal direction 12 to the back. Within the context of this shifting movement the support struts 42 of the swiveling levers 30, 32 support themselves in longitudinal direction 12 on the respective fixed stop 44 so that a swivel movement of all swiveling levers 30, 32, 34, 36 about the corresponding first swiveling axis 38 takes place. In this manner, the swiveling levers 30, 32, 34, 36 are swiveled from the first swiveling position in FIG. 1 into a second swiveling position, which is shown in FIG. 2, through the shifting of the motor vehicle seat 2 in longitudinal direction 12.

Since the seat part 4 of the motor vehicle seat 2 in the region of the second swivel axes 40 is likewise connected with the swiveling lever 30, 32, 34, 36, the motor vehicle seat 2 through swiveling of the swiveling levers 30, 32, 34, 36 in transverse direction 14 is shifted from the first transverse position (FIG. 1) into the second transverse position (FIG. 2). As is evident from FIGS. 1 and 2 the motor vehicle seat 2 in the second transverse position compared with the first transverse position is arranged offset in transverse direction 14. The swiveling levers 30, 32, 34, 36 in their second swiveling position substantially extend in transverse direction 14, 16.

From FIG. 2, it is evident that the swiveling levers 30, 32, 34, 36 swiveled into the second swiveling position merely extend slightly in transverse direction 14 or 16 into the footwell or stowage space underneath the motor vehicle seat 2, so that in contrast with a continuous transverse rail major space saving is achieved. In addition to this it is evident from the preceding description that the longitudinal sliding movement in longitudinal direction 12 and the transverse sliding movement in transverse direction 14 are coupled with each other in a particularly advantageous manner. This applies also in reverse direction.

If the motor vehicle seat 2 is to be shifted again from the longitudinal position shown in FIG. 2 forward into the first longitudinal position in longitudinal direction 10 in this case the support struts 42 of the swiveling levers 34, 36 support themselves in longitudinal direction 10 on the corresponding fixed stop 44 so that a swiveling movement of all swiveling levers 30, 32, 34, 36 about the first swiveling axis 38 in the opposite direction is generated. In this manner, the motor vehicle seat 2 pushed back in longitudinal direction 10 into the first longitudinal position returns from the second transverse position shown in FIG. 2 into the first transverse position shown in FIG. 1.

From the preceding description it is evident that the stops 44 assigned to the swiveling levers 30, 32 serve for the generation of the adjusting movement in transverse direction 14 while the fixed stops 44, which are assigned to the swiveling levers 34, 36, serve for the generation of the resetting movement in transverse direction 16. In an alternative embodiment which is not shown in more detail however, the stops 44 assigned to the swiveling levers 34, 36 could be omitted in that in or at least one of the swiveling levers 30, 32, 34, 36 is preloaded into the first or second swiveling position, wherein the swiveling levers 30, 32, 34, 36 in this case should be preloaded into the first swiveling position. In this case the preload force would bring about the resetting movement in transverse direction 16. For preloading the swiveling levers or one of the swiveling levers 30, 32, 34, 36 a suitable spring element could for example be arranged on the respective swiveling lever 30, 32, 34, 36 or the support strut 42.

In order to be able to lock the motor vehicle seat 2 in any longitudinal or transverse position, at least one of the swiveling levers 30, 32, 34, 36 can be locked in any swiveling position. To this end, a rotary latch lock is preferentially provided in the region of the first swiveling axis 38 of the respective swiveling lever 30, 32, 34, 36.

In two further alternative embodiments of the embodiment described above no support strut 42 and no stop 44 assigned to this support strut 42 has to be provided as a matter of principle. Thus, the adjusting device 6 in a first alternative can comprise a positive guide, preferentially a slotted guide, for coupling the longitudinal and transverse sliding movement of the motor vehicle seat 2, wherein the positive guide then particularly preferably on the one hand comprises a guide slot, which is formed fixed on the vehicle or fixed on the seat, and on the other hand comprises a guide part guided in the guide slot, which is formed fixed on the seat or fixed on the vehicle. For coupling the longitudinal and transverse sliding movement the guide slot would then have to at least comprise an inclined section which extends transversely to the longitudinal and transverse direction 10, 12; 14, 16. This first alternative has the advantage that the positive guide need not be arranged directly in the region of the swiveling levers 30, 32, 34, 36 but can be arranged on the motor vehicle seat 2 or the vehicle floor 8 as required. In the second alternative a gear drive for coupling the longitudinal sliding of the motor vehicle seat 2 with the swiveling movement of the swiveling levers 30, 32, 34, 36 can be provided instead of the support struts 42 and the associated stop 44. Thus, a rack on the lower rail 26 is conceivable for example along which a pinion rolls when the motor vehicle seat 2 is shifted in longitudinal direction 10, 12, wherein the rotary movement of such a pinion is then transmitted on to the swiveling lever 30, 32, 34, 36.

Figure 3:
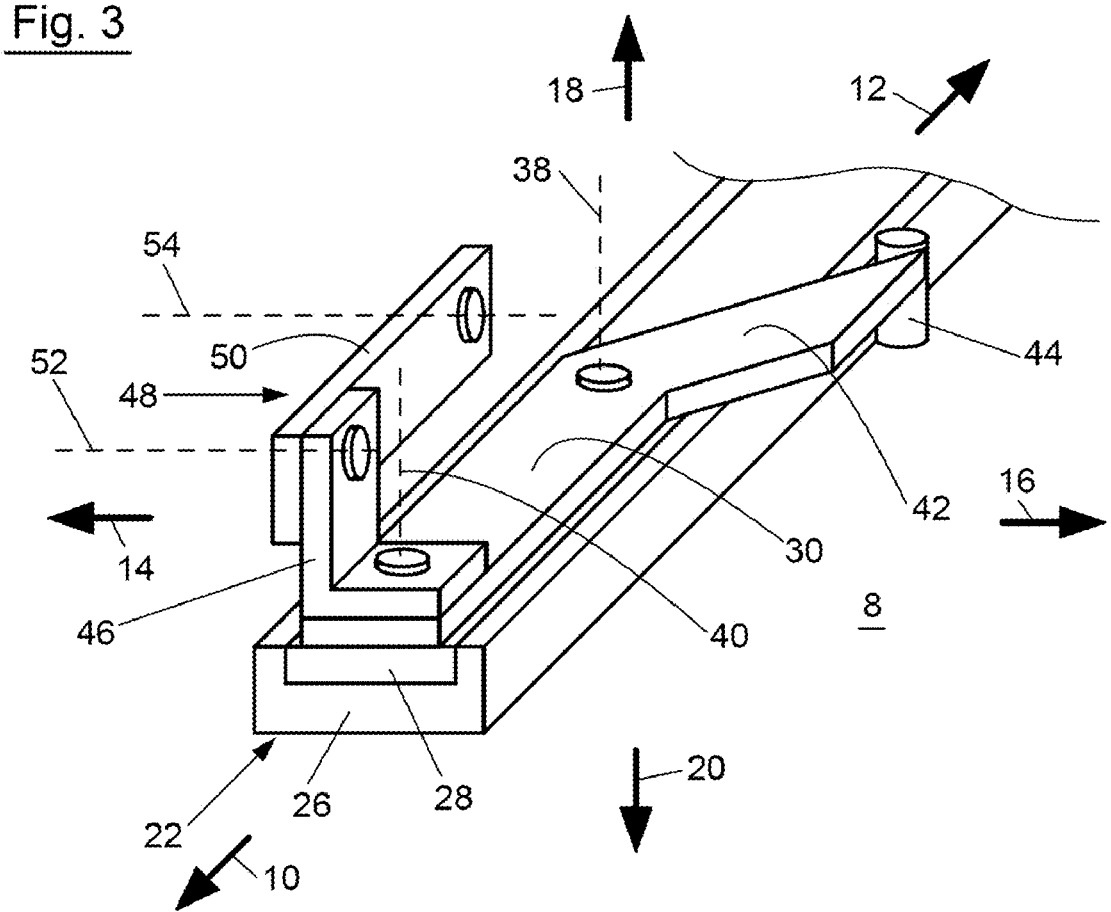
FIG. 3 a perspective partial representation of the adjusting device of FIG. 1 and FIG. 2 in the region of a swiveling lever.

As already explained with the reference to FIG. 1 and FIG. 2, the swiveling levers 30, 32, 34, 36 can be indirectly or directly connected with the motor vehicle seat 2. FIG. 3 now shows an embodiment wherein the swiveling levers 30, 32, 34, 36 are indirectly connected with the motor vehicle seat 2. This indirect connection is indicated as an example by means of the swiveling lever 30. Thus the end of the swiveling lever 30 facing away from the first swiveling axis 38 is connected with an angular part 46 of a height adjusting device 48 in a manner capable of being swiveled about the second swiveling axis 40. The height adjusting device 48 furthermore comprises a second swiveling lever 50 which on the one hand is connected with the angular part 46 in a manner capable of being swiveled about a third swiveling axis 52 running in transverse direction 14, 16 and on the other hand is connected with the motor vehicle seat 2 which is not shown in FIG. 3 in a manner capable of being swiveled about a fourth swiveling axis 54 likewise running in transverse direction 14, 16. If the second swiveling lever 50 is swiveled about the third swiveling axis 52 the position of the seat part 4 of the motor vehicle seat 2 can be changed in height direction 18, 20. In addition to this it is possible to vary the positioning of the seat part 4 of the motor vehicle seat 2 in longitudinal direction 10, 12 in a certain range. The function of the first swiveling lever 30, 32, 34, 36 remains unaffected by this.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle seat with an adjusting device, comprising:
    a longitudinal sliding device comprising a rail arrangement having a vehicle fixed lower rail and an upper rail guided on the vehicle fixed lower rail for sliding the motor vehicle seat in a longitudinal direction; a fixed stop that is fixed relative to the lower fixed rail; and
    a transverse sliding device for sliding the motor vehicle seat in a transverse direction as the motor vehicle seat moves in the longitudinal direction, the transverse sliding device comprising a swiveling lever that is arranged on the longitudinal sliding device and also arranged on the motor vehicle seat,
    wherein the swiveling lever can be swiveled from a first swiveling position, in which the motor vehicle seat is arranged in a first transverse position, into a second swiveling position, in which the motor vehicle seat with respect to the first transverse position offset in a second transverse position and wherein the fixed stop is positioned in a longitudinal path of a portion of the swiveling lever such that during longitudinal movement of the upper rail, the swiveling lever is engaged by the fixed stop and the fixed stop causes the swiveling lever to swivel from the first transverse position to the second transverse position.

2. The motor vehicle seat according to claim 1, wherein the swiveling lever is arranged on the longitudinal sliding device capable of being swiveled about a first swiveling axis extending in height direction.

3. The motor vehicle seat according to claim 1, wherein the swiveling lever is arranged on the motor vehicle seat in a manner capable of being swiveled about a second swiveling axis extending in height direction.

4. The motor vehicle seat according to claim 1, wherein the swiveling lever extends in the first swiveling position in the longitudinal direction and in another swiveling position in the transverse direction.

5. The motor vehicle seat according to claim 1, wherein the swiveling lever extends in the second swiveling position in the longitudinal direction and in another swiveling position in the transverse direction.

6. The motor vehicle seat according to claim 1, wherein the swiveling lever can be swiveled in the longitudinal direction from the first swiveling position into the second swiveling position, and in an opposite longitudinal direction can be swiveled from the second swiveling position into the first swiveling position.

7. The motor vehicle seat according to claim 1, wherein the swiveling lever can be swiveled in the longitudinal direction from the first swiveling position into the second swiveling position through sliding the motor vehicle seat, and in an opposite longitudinal direction can be swiveled from the second swiveling position into the first swiveling position, through sliding the motor vehicle seat.

8. The motor vehicle seat according to claim 6, wherein the swiveling lever further includes a support strut that upon longitudinal shifting of the motor vehicle seat, the support strut is engaged by the fixed stop and generates a swivel movement of the swiveling lever.

9. The motor vehicle seat according to claim 8, wherein the swiveling lever and the support strut are arranged at an angle to each other.

10. The motor vehicle seat according to claim 8, wherein the swiveling lever and the support strut are formed of one piece.

11. The motor vehicle seat according to claim 1, wherein the rail arrangement extends in the longitudinal direction,
    wherein the swiveling lever in the first swiveling position extends parallel to the rail arrangement.

12. The motor vehicle seat according to claim 1, wherein the rail arrangement extends in the longitudinal direction,
    wherein the swiveling lever in the second swiveling position extends parallel to the rail arrangement.

13. The motor vehicle seat according to claim 1, wherein the swiveling lever is a first swiveling lever of; at least two swiveling levers and the first swiveling; lever of the at least two swiveling levers is on a first side of the adjusting device and a second swiveling lever of the at least two swiveling levers is arranged on a second side of the adjusting device located opposite the first swiveling lever in the transverse direction.

14. The motor vehicle seat according to claim 13, wherein the fixed stop is a first corresponding stop and at least one of the at least two swiveling levers is adapted to interact with the first corresponding stop in such a manner that the at least two swiveling levers through a sliding of the motor vehicle seat can be swiveled from the first swiveling position into the second swiveling position, while another one of the at least two swiveling levers is adapted to interact with a second corresponding stop in a second manner that the at least two swiveling levers through the sliding of the motor vehicle seat in an opposite longitudinal direction can be swiveled from the second swiveling position into the first swiveling position.

15. A motor vehicle seat with an adjusting device, comprising:

a longitudinal sliding device comprising a rail arrangement having a vehicle fixed lower rail and an upper rail guided on the vehicle fixed lower rail for sliding the motor vehicle seat in longitudinal direction; a stop that is fixed relative to the lower fixed rail; and a transverse sliding device for automatically sliding the motor vehicle seat in a transverse direction as the motor vehicle seat slides in the longitudinal direction, the transverse sliding device comprising at least one swiveling lever coupled to the longitudinal sliding device and also coupled to the motor vehicle seat; and wherein the stop is positioned in a longitudinal path of a portion of the swiveling lever such that during longitudinal movement of the upper rail, the swiveling lever is engaged by the stop and the stop causes the swiveling lever to swivel from the first transverse position to the second transverse position.

16. The motor vehicle seat according to claim 15, wherein the swiveling lever includes a support strut engaging the stop on the longitudinal sliding device causing the transverse sliding device to automatically slide in the transverse direction as the motor vehicle seat slides in the longitudinal direction from a first longitudinal position to a second longitudinal position.

17. The motor vehicle seat according to claim 16, wherein the stop is a first stop and the transverse direction is a first transverse direction, further comprising a second swiveling lever having a second support strut engaging a second stop on the longitudinal sliding device causing the transverse sliding device to automatically slide in a second transverse direction opposite the first transverse direction as the motor vehicle seat slides in the longitudinal direction from the second longitudinal position to the first longitudinal position.

18. A motor vehicle seat with an adjusting device, comprising:

a longitudinal sliding device comprising a rail arrangement having a vehicle fixed lower rail and an upper rail guided on the vehicle fixed lower rail for sliding the motor vehicle seat in longitudinal direction from a first longitudinal position to a second longitudinal position; a stop that is fixed relative to the lower fixed rail; and a transverse sliding device for sliding the motor vehicle seat in a transverse direction from a first transverse position to a second transverse position as the motor vehicle seat slides from the first longitudinal position to the second longitudinal position, the transverse sliding device comprising at least one swiveling lever coupled to the longitudinal sliding device and also coupled to the motor vehicle seat and wherein the stop is positioned in a longitudinal path of a portion of the swiveling lever such that during longitudinal movement of the upper rail, the swiveling lever is engaged by the stop and the stop causes the swiveling lever to swivel from the first transverse position to the second transverse position.

19. The motor vehicle seat according to claim 18, wherein the swiveling lever includes a support strut engaging the stop coupled to the longitudinal sliding device causing the transverse sliding device to automatically slide in the transverse direction as the motor vehicle seat slides in the longitudinal direction from the first longitudinal position to the second longitudinal position.

20. The motor vehicle seat according to claim 19, wherein the stop is a first stop and the transverse direction is a first transverse direction, further comprising a second swiveling lever having a second support strut engaging a second stop coupled to the longitudinal sliding device causing the transverse sliding device to automatically slide in a second transverse direction opposite the first transverse direction as the motor vehicle seat slides in the longitudinal direction from the second longitudinal position to the first longitudinal position.

* * * * *